US011563800B1

(12) United States Patent
Trendafilov et al.

(10) Patent No.: US 11,563,800 B1
(45) Date of Patent: Jan. 24, 2023

(54) DISTRIBUTED SEMANTIC NETWORK FOR CONCURRENT ACCESS TO INTERCONNECTED OBJECTS

(71) Applicant: VMWARE, INC., Palo Alto, CA (US)

(72) Inventors: Ianislav Trendafilov, Sofia (BG); Raja Shekar Chelur, Cary, NC (US); Ralitsa Todorova Tsanova, Sofia (BG); Sirish Kumar Bangalore Renukumar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/698,009

(22) Filed: Mar. 18, 2022

(30) Foreign Application Priority Data

Jan. 21, 2022 (IN) .............................. 202241003640

(51) Int. Cl.
*H04L 29/08* (2006.01)
*H04L 12/46* (2006.01)
*H04L 67/10* (2022.01)
*H04L 47/70* (2022.01)

(52) U.S. Cl.
CPC .......... *H04L 67/10* (2013.01); *H04L 12/4641* (2013.01); *H04L 47/82* (2013.01)

(58) Field of Classification Search
CPC ..... H04L 67/10; H04L 12/4641; H04L 47/82; H04L 47/70; H04L 47/72
USPC ....................................................... 709/223
See application file for complete search history.

(56) References Cited

U.S. PATENT DOCUMENTS

| 5,835,910 | A | * | 11/1998 | Kavanagh | ............. | G06F 16/289 |
| | | | | | | 700/98 |
| 2008/0243846 | A1 | * | 10/2008 | Rasmussen | ......... | G06F 16/1774 |
| 2008/0243847 | A1 | * | 10/2008 | Rasmussen | ......... | G06F 16/1774 |
| 2010/0070448 | A1 | * | 3/2010 | Omoigui | ............. | H01L 27/1463 |
| | | | | | | 706/55 |
| 2011/0107338 | A1 | * | 5/2011 | Ylonen | ................... | G06F 9/467 |
| | | | | | | 718/102 |
| 2020/0320062 | A1 | * | 10/2020 | Korpman | .............. | G06F 16/244 |

OTHER PUBLICATIONS

U.S. Appl. No. 17/709,469, filed Mar. 31, 2022.

* cited by examiner

*Primary Examiner* — Ruolei Zong
(74) *Attorney, Agent, or Firm* — Patterson & Sheridan, LLP

(57) ABSTRACT

An example method of reserving a resource of virtualized infrastructure in a data center on behalf of a client includes: obtaining, by a distributed semantic network, a set of facts corresponding to resources in the virtualized infrastructure and a set of rules corresponding to relationships between the resources; receiving, at the first semantic network instance, a first reservation request for a first resource of the virtualized infrastructure from a first client, wherein the first reservation request comprises a first rule specifying a requested exclusive lock on the first resource; passing the first rule from the first semantic network instance to the second semantic network instance; receiving an acknowledgement from the second semantic network instance in response to passing the first rule; and sending an acknowledgement to the first client that the first rule specifying the requested exclusive lock on the first resource has been created.

20 Claims, 11 Drawing Sheets

DISTRIBUTED SEMANTIC NETWORK FOR CONCURRENT ACCESS TO INTERCONNECTED OBJECTS

RELATED APPLICATION

Benefit is claimed under 35 U.S.C. 119(a)-(d) to Foreign Application Serial No. 202241003640 filed in India entitled "DISTRIBUTED SEMANTIC NETWORK FOR CONCURRENT ACCESS TO INTERCONNECTED OBJECTS", on Jan. 21, 2022, by VMware, Inc., which is herein incorporated in its entirety by reference for all purposes.

Modern applications can be deployed in a multi-cloud or hybrid cloud fashion, such as, consuming both cloud services executing in a public cloud and local services executing in a private data center (e.g., a private cloud). Within the public cloud and private data center, applications can be deployed onto one or more virtual machines (VMs), containers, application services, and/or more within a software-defined datacenter (SDDC). The SDDC includes a server virtualization layer having clusters of physical servers that are virtualized and managed by virtualization management servers. A host can include a virtualization layer (e.g., a hypervisor) that provides a software abstraction of a physical server (e.g., central processing unit (CPU), random access memory (RAM), storage, network interface card (NIC), etc.) to the VMs.

Cloud management software can be deployed, in a private data center and/or as a cloud service in a public cloud, to implement a higher-level automation system. Users of a private cloud or tenants of a public cloud submit requests to the cloud management software for infrastructure to grow, shrink, or be modified in some fashion. The cloud management software executes workflows (e.g., processes, applications, services, etc.) in response to these requests. Since the cloud management software can receive multiple requests concurrently, the software implements resource reservation to disallow conflicting operations.

In a complex distributed system, objects are interconnected with each other. To perform an operation on an object, constraints may be placed on other objects related to that object. One technique is for the cloud management software to reserve the entire system for each workflow. The system resources are locked for use by a particular workflow. Other workflows cannot be started until the system-wide reservation is released. This type of reservation system is not scalable to handle dynamic environments and can result in inefficient handling of workflows.

When an object is locked, all of the object's child objects are also locked and constraints are added to other objects associated with the object. Thus, for a single operation on an object, the state (e.g., locked, unlocked, constrained, etc.) of many objects may need to be updated. In systems with thousands of objects, the number of objects to be updated for a single operation may be very large. The large numbers of objects to update may be the limiting factors in the maximum scale of the system.

SUMMARY

One or more embodiments provide a method of reserving a resource of virtualized infrastructure in a data center on behalf of a client. The method includes: obtaining, by a distributed semantic network, a set of facts corresponding to resources in the virtualized infrastructure and a set of rules corresponding to relationships between the resources in the virtualized infrastructure, the distributed semantic network including at least a first semantic network instance and a second semantic network instance; receiving, at the first semantic network instance, a first reservation request for a first resource of the virtualized infrastructure from a first client, wherein the first reservation request comprises a first rule specifying a requested exclusive lock on the first resource; passing the first rule from the first semantic network instance to the second semantic network instance; receiving, at the first semantic network instance, an acknowledgement from the second semantic network instance in response to passing the first rule; and sending an acknowledgement to the first client that the first rule specifying the requested exclusive lock on the first resource has been created.

Further embodiments include a non-transitory computer-readable storage medium comprising instructions that cause a computer system to carry out the above methods, as well as a computer system configured to carry out the above methods.

DETAILED DESCRIPTION

Figure 1A:
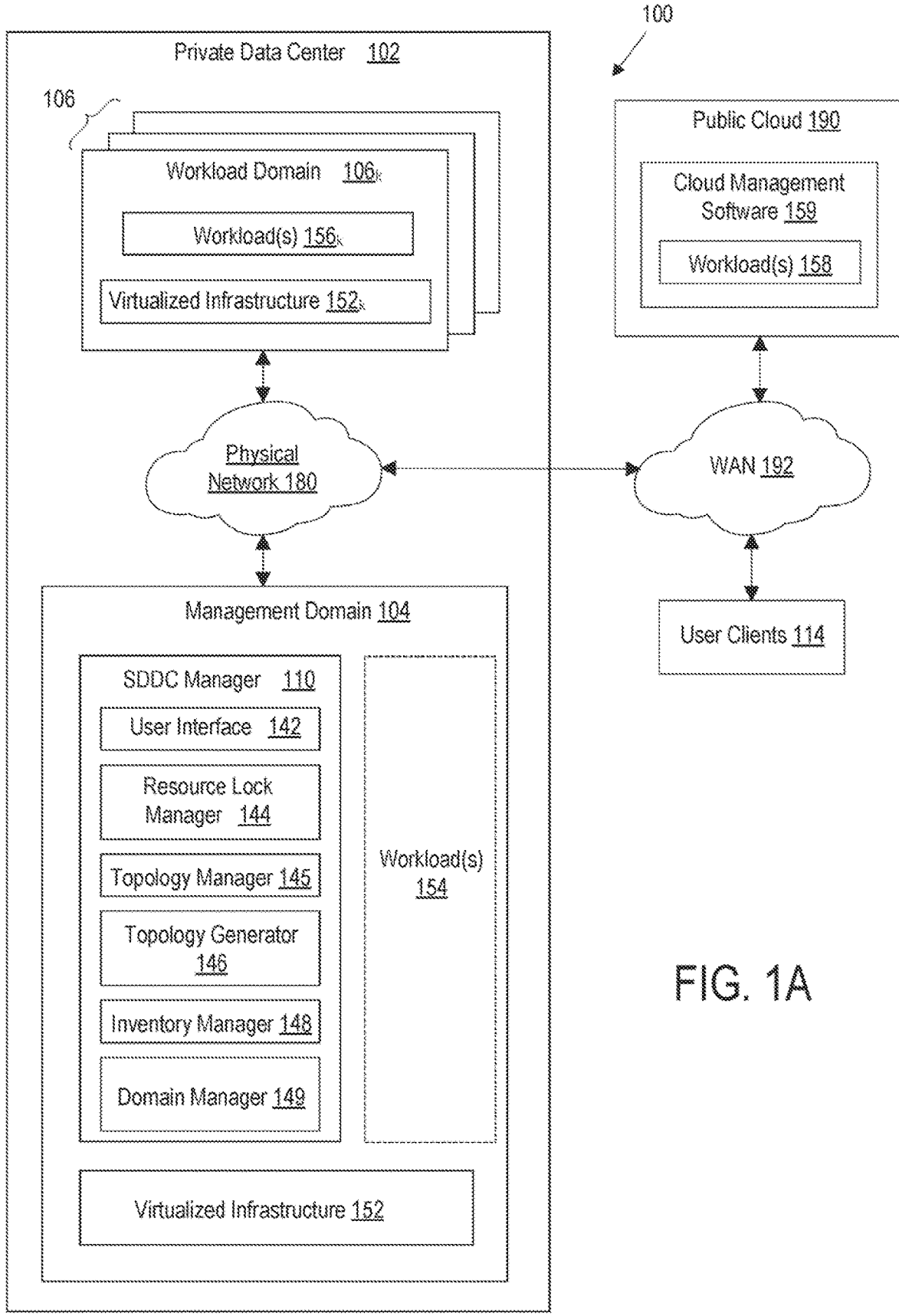
FIG. 1A is a block diagram of a multi-cloud computing system in which embodiments described herein may be implemented.

Aspects of the disclosure provide a distributed semantic network for concurrent access to interconnected objects. An object may be a resource (e.g., in a virtual network, a resource may be a host, a cluster of hosts, a network manager, a virtualization manager, or the like) or data (e.g., a configuration, metadata, or other information) associated with a resource, such as a virtualized infrastructure resource. A semantic network is a knowledge base that represents semantic relationships between objects in a network. The knowledge base of the semantic network includes facts and rules. The facts may represent the objects in the system and the rules may specify relationships between the objects. For example, a rule may specify two objects as linked or associated. Linked objects may have a parent-child relationship. Where two objects are linked, when one of the objects is locked the linked object is also locked. Where two objects are associated, when one of the objects is locked, the associated object is constrained. When an object is constrained, it cannot be locked. As discussed in more detail herein, a lock may be an exclusive lock and a constraint may be a limited lock. Knowledge synchronization in the distributed semantic network may be implemented using a hierarchal key-value store or a shared database. One example of a service for maintaining a shared database is ZooKeeper™, which is made available from Apache Software Foundation of Wakefield, Mass.

In some embodiments, the semantic network uses a homoiconic logic programming language, such as prolog. Homoiconicity is a property of programming languages. A programming language is homoiconic if a program written in the programming language can be manipulated as data using the language and, thus, the program's internal representation can be inferred by reading the program itself. Homoiconicity allows for new rules to be included in the distributed semantic network in the form of knowledge. This allows extensibility of the distributed semantic network, while guaranteeing synchronization of knowledge on all instances of the distributed semantic network. The semantic network may receive questions from a client or user about an object (e.g., a query whether a requested lock is permitted) and, based on the rules, the semantic network may provide a "yes" or "no" response to the question.

According to embodiments of the present disclosure, the semantic network is a "distributed" semantic network. As used herein, a distributed semantic network is a service composed of multiple synchronized instances of the semantic network where each instance of the semantic network has the same knowledge. Each instance may run on a separate physical or virtual computing device. If an object or rule is created or changed, the update is pushed to each instance of the semantic network synchronously, so that the semantic network instances are always up to date with the same knowledge. Because all instances of the distributed semantic network have the same knowledge, the distributed semantic network can solve for missing knowledge (e.g., due to an update while the instance is offline) and self-synchronize. For example, when a client requests a semantic network instance for a lock on an object (e.g., to a reserve a system resource for the client), the lock on the object can be stored at the distributed semantic network as a new rule and the new rule is synchronized to each of the semantic network instances. The distributed semantic network can determine the locks and constraints on the linked and associated objects based on the knowledge rules. Thus, only the locked object may be updated, instead of updating the state of all of the linked and associated objects. When a client requests to validate a lock, the distributed semantic network determines the object lock state based on the knowledge rules. Accordingly, the number of computations and operations may be few (e.g., single digits), even if thousands of objects are affected by an operation.

Further, the distributed semantic network may generate new rules based on its rules. For example, after a lock is created, the distributed semantic network can create a new rule to assign a unique and sequential number to the lock. The distributed semantic network can use the sequential number to validate a lock. For example, a client queries the distributed semantic network whether a lock requested by the client is permitted and the client includes its universally unique identifier (UUID) in the query. The distributed semantic network checks, based on its knowledge rules, whether any linked or associated objects already has a lock or constraint on it with an assigned sequential number lower than the sequential number assigned to the lock being validated. If there is not a lock or constraint on the linked and associated objects, the distributed semantic network will reply "YES" to the client, indicating the lock is permitted on the object. If there is a lock or constraint on a linked or associated object, the distributed semantic network will reply "NO" to the client, indicating the lock is not permitted on the object. When the lock is not validated, the client may periodically retry the lock. The distributed semantic network will reply with "NO" until the earlier lock on the other object (or objects) is released. When an object is locked, the client may perform an operation on the object and then query the distributed semantic network to release the lock on the object. The distributed semantic network will delete the lock on the object as well as any locks or constraints on other linked or associated objects.

The distributed semantic network may provide improved performance by reducing the number of computations and operations needed for performing an operation on an object and updating the status of the object. The distributed semantic network may provide decentralization by providing multiple instances of the semantic network with the same knowledge that can process queries from different clients. The distributed semantic network may provide reproducibility because all instances of the distributed semantic network are running the same set of facts and rules at any given point in time. The distributed semantic network provides restorability of the system because if an instance of the semantic network is down, the knowledge of the other instances are synchronized to the instance.

FIG. 1A is a block diagram of a multi-cloud computing system 100 in which embodiments described herein may be implemented. Multi-cloud computing system 100 includes private data center 102 in communication with a public cloud 190. In embodiments, private data center 102 can be controlled and administered by a particular enterprise or business organization, while public cloud 190 is operated by a cloud computing service provider and exposed as a service available to account holders ("tenants"). The operator of private data center 102 can be a tenant of public cloud 190 along with a multitude of other tenants. Private data center 102 is also known as an on-premises data center, on-premises cloud, or private cloud. Multi-cloud system computing 100 is also known as a hybrid cloud system.

Private data center 102 includes virtualized infrastructure 152 comprising servers (e.g., disposed in racks) and physical network devices (e.g., top-of-rack (TOR) switches, routers, cabling, etc.). The servers have virtualization software installed thereon and are referred to as "hosts." Private data center 102 includes cloud management software installed on virtualized infrastructure 152. The cloud management software provides automated deployment and lifecycle management of private data center 102 as a software-defined data center (SDDC). The cloud management software enables provisioning of virtualized workloads (in virtual machines (VMs) and/or containers) in private data center 102 and the migration of workloads between private data center 102 and public cloud 190. The cloud management software includes a management domain 104 and one or more workload domains 106 (e.g., workload domain $106_k$ is shown in detail).

Management domain 104 includes an SDDC manager 110 provisioned on a portion of virtualized infrastructure 152 ("virtualized infrastructure $152_1$"). For example, SDDC manager 110 can execute in VMs and/or containers of one or more hosts. In some embodiments, a user can provision workloads 154 on virtualized infrastructure $152_1$ alongside SDDC manager 110. Workloads 154 can be any application software executing in VMs and/or containers of one or more hosts. In other embodiments, virtualized infrastructure $152_1$ is dedicated for use with SDDC manager 110 and workloads 154 are omitted. Each workload domain 106 includes a portion of virtualized infrastructure 152 (e.g., virtualized infrastructure $152_k$ for workload domain $106_k$) and workload(s) executing thereon (e.g., workloads $156_k$ for workload domain $106_k$). The workloads in each workload domain 106 can be any application software executing in VMs and/or containers of one or more hosts. A user can provision or migrate some workload(s) 158 to public cloud 190.

The hosts of virtualized infrastructure 152 are connected by physical network 180. Physical network 180 is connected to a wide area network (WAN) 192, such as the public Internet. Private data center 102 communicates with public cloud 190 over WAN 192. Users can access software executing in private data center 102 and public cloud 190 through WAN 192 using user clients 114 (e.g., computers, mobile devices, etc.).

In embodiments, a tenant of public cloud 190 consumes cloud management software 159 as a service of public cloud 190. Public cloud 190 includes virtualized infrastructure that is the same or similar to that of private data center 102 and cloud management software 159 functions the same or similar to how it functions in private data center 102. For purposes of clarity by example, resource reservation techniques of the cloud management software are described with respect to use in private data center 102. However, the techniques are equally applicable to use in public cloud 190 or any data center having virtualized infrastructure in general. Also, while a multi-cloud system is shown, the cloud management system can be deployed in a single data center system.

Figure 1B:
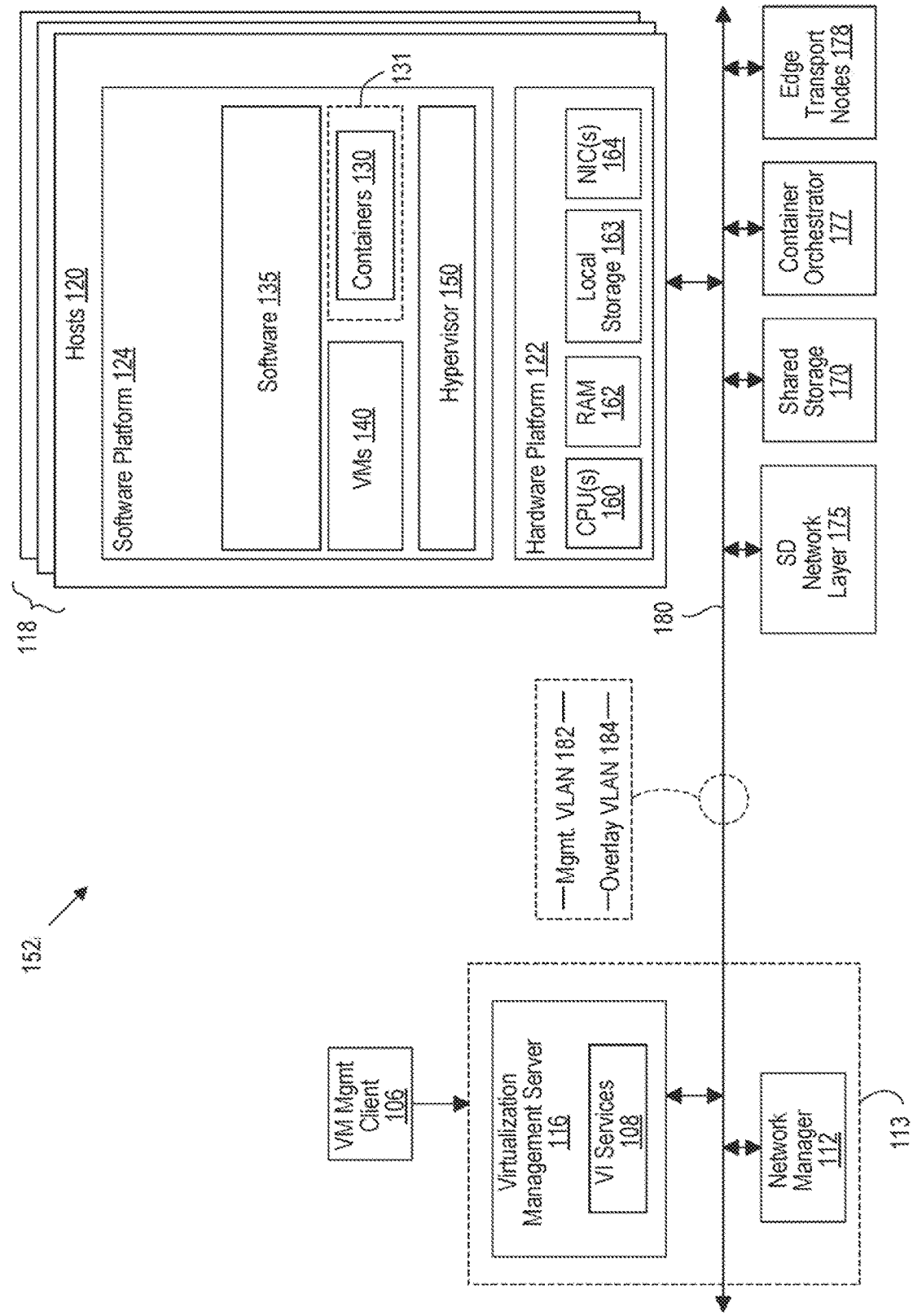
FIG. 1B is a block diagram depicting a virtualized infrastructure according to an embodiment.

FIG. 1B is a block diagram depicting virtualized infrastructure $152_1$ according to an embodiment. Virtualized infrastructure $152_i$ can be part of a domain, such as management domain 104 (e.g., virtualized infrastructure $152_1$) or a workload domain 106 (e.g., virtualized infrastructure $152_k$). Virtualized infrastructure $152_i$ includes hosts 120 that may be constructed on server-grade hardware platforms such as x86 architecture platforms. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Hosts 120 can be in a single host cluster 118 or logically divided into a plurality of host clusters 118.

Hosts 120 access shared storage 170 by using NICs 164 to connect to physical network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. Software 135 executes in VMs 140 and/or containers 130.

Hosts 120 are configured with a software-defined (SD) network layer 175. SD network layer 175 includes logical network services executing on virtualized infrastructure of hosts 120. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, virtualized infrastructure $152_i$ includes edge transport nodes 178 that provide an interface of hosts 120 to WAN 192. Edge transport nodes 178 can include a gateway between the internal logical networking of hosts 120 and the external network. Edge transport nodes 178 can be physical servers or VMs.

Virtualization management server 116 is a physical or virtual server that manages hosts 120 and the virtualization layers therein. Virtualization management server 116 installs agent(s) in hypervisor 150 to add a host 120 as a managed entity. Virtualization management server 116 logically groups hosts 120 into host cluster(s) 118 to provide cluster-level functions to hosts 120, such as VM migration between hosts 120 (e.g., for load balancing), distributed power management, dynamic VM placement according to affinity and anti-affinity rules, and high-availability. The number of hosts 120 in each host cluster 118 may be one or many.

In an embodiment, multi-cloud computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. In this manner, a host cluster 118 can be a cluster of transport nodes. One example of an SD networking platform that can be configured and used in embodiments described herein as network manager 112 and SD network layer 175 is a VMware NSX® platform made commercially available by VMware, Inc. of Palo Alto, Calif. In some embodiments, one or more of workload domains 106 can share an instance of network manager 112. Thus, network manager 112 may be omitted from virtualized infrastructure $152_1$ for some domains.

Physical network 180 can be divided into multiple virtual local area networks (VLANs), such as a management VLAN 182 and an overlay VLAN 184. Management VLAN 182 enables a management network connecting hosts 120, VI control plane 113 (e.g., virtualization management server 116 and network manager 112), and SDDC manager 110. Overlay VLAN 184 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network for each host cluster 118 using the overlay network. The overlay transport zone can be extended into at least one of edge transport nodes 178 to provide ingress/egress between a cluster network and an external network.

Virtualization management server 116 and network manager 112 comprise a virtual infrastructure (VI) control plane 113 of virtualized infrastructure $152_1$. Virtualization management server 116 can include various VI services 108. VI services 108 include various virtualization management services, such as a distributed resource scheduler (DRS), high-availability (HA) service, single sign-on (SSO) service, virtualization management daemon, and the like. An SSO service, for example, can include a security token service, administration server, directory service, identity management service, and the like configured to implement an SSO platform for authenticating users.

In embodiments, virtualized infrastructure $152_i$ can include a container orchestrator 177. Container orchestrator 177 implements an orchestration control plane, such as Kubernetes®, to deploy and manage applications or services thereof on host cluster 118 using containers 130. In embodiments, hypervisor 150 can support containers 130 executing directly thereon. In other embodiments, containers 130 are deployed in VMs 140 or in specialized VMs referred to as "pod VMs 131." A pod VM 131 is a VM that includes a kernel and container engine that supports execution of containers, as well as an agent (referred to as a pod VM agent) that cooperates with a controller executing in hypervisor 150 (referred to as a pod VM controller). Container orchestrator 177 can include one or more master servers configured to command and configure pod VM controllers in host cluster 118. Master server(s) can be physical computers attached to physical network 180 or VMs 140 in a host cluster 118.

Returning to FIG. 1A, SDDC manager 110 includes a user interface 142, a resource lock manager 144, a topology manager 145, a topology generator 146, an inventory manager 148, and a domain manager 149. SDDC manager 110 receives requests from users through user interface 142 and domain manager 149 executes workflows in response to the requests. User interface 142 can also include an application programming interface (API) for use by software to access SDDC manager 110. Requests can be, for example, requests to create, update, or destroy, resources of virtualized infrastructure 152. In some cases, external software can provide workflows to SDDC manager 110 through user interface 142 for operations on virtualized infrastructure 152. SDDC manager 110 is configured to allow operations on resources of virtualized infrastructure 152 without preventing operations on other resources. SDDC manager 110 disallows a resource of virtualized infrastructure 152 from being modified or deleted if another operation is currently operating on that resource. As discussed in more detail with respect to FIG. 6, portions of SDDC manager 110 may be implemented as a distributed semantic network.

A resource of virtualized infrastructure 152 is a component of physical or logical infrastructure. A resource can be a single host, a cluster of hosts, an appliance (e.g., virtualization management server 116, network manager 112, edge transport nodes 178), or a domain (e.g., management domain 104 or a workload domain 106). A resource graph is a hierarchy of resources in virtualized infrastructure 152. Resources can be in parent/child relationships or other relationships (e.g., depends on). For example, a host can be a child of a cluster, which in turn can be a child of a domain, which in turn can be a child of the cloud management instance (root). A workflow is a user-initiated or software-initiated operation on virtualized infrastructure 152. Workflows include create, update, destroy, and other types of mutative operations on resources. Examples include creating a workload domain, creating a cluster, commissioning or decommissioning a host, rotating passwords, or the like. Each workflow has a resource against which it is initiated. A workflow can have one or more operations executed against a member resource. For example, a password rotate operation can be initiated against a cluster, but the operation is performed one host at a time. Workflows can be internal to SDDC manager 110 (e.g., a user makes a request and SDDC manager 110 starts a workflow) or external to SDDC manager 110 (e.g., external software provides operations to be performed against resources).

Figure 2:
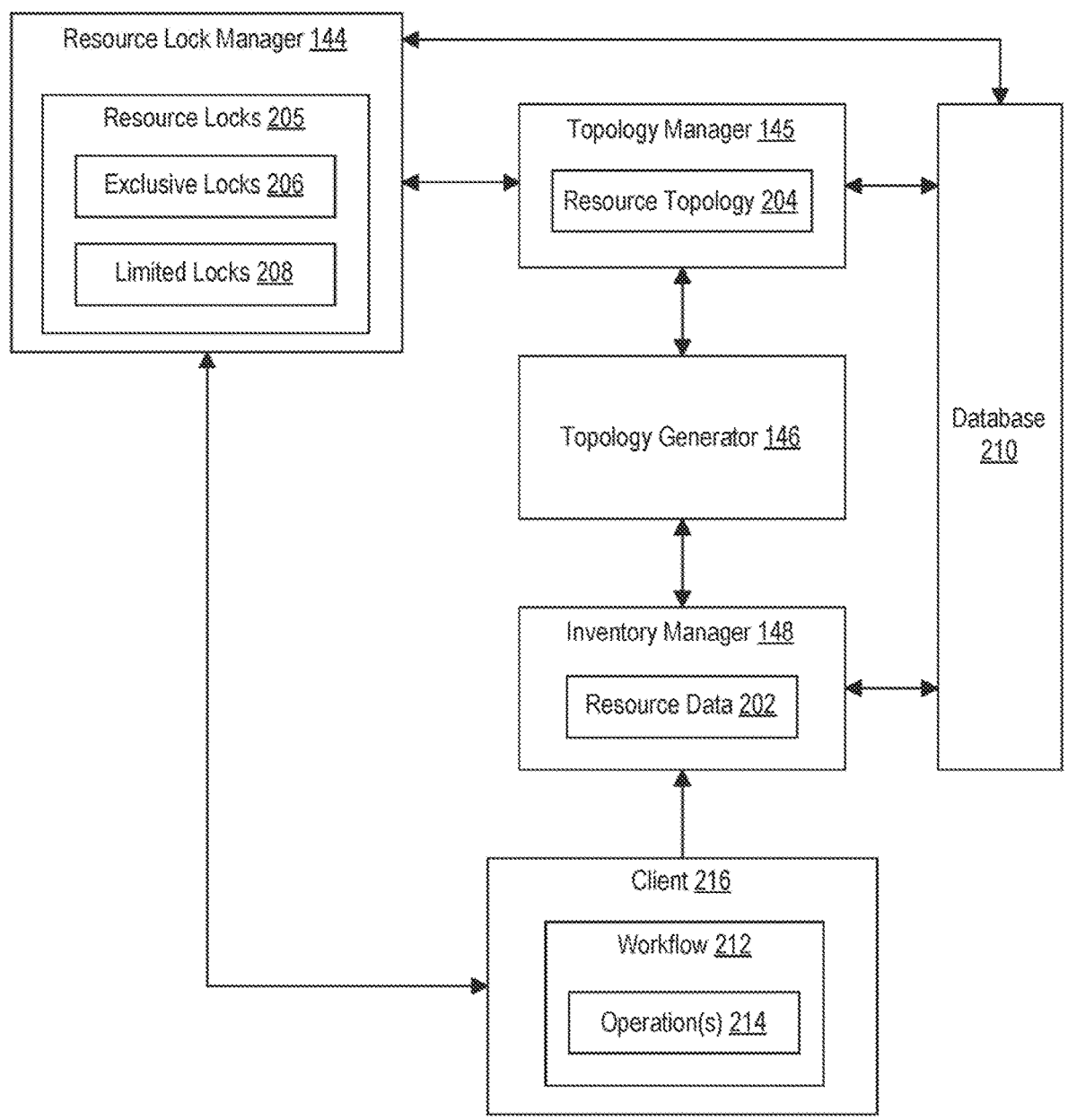
FIG. 2 is a block diagram depicting logical relation of SDDC manager components according to an embodiment.

FIG. 2 is a block diagram depicting logical relation of SDDC manager components according to an embodiment. Inventory manager 148 maintains resource data 202 for virtualized infrastructure 152. A client 216 initiates a workflow 212, which includes one or more operations 214 to be performed on resource(s) of virtualized infrastructure 152. Client 216 can be a component of SDDC manager 110 (e.g., domain manager 149) or external software. Workflows that create, update, or destroy the resources cooperate with inventory manager 148 to persist, update, and remove resources based on resource identifiers. Inventory manager 148 stores resource data 202 in a plurality of tables, such as a cluster table for cluster resources, a cluster-and-host table that relates cluster and host resources, a host table for host resources, a cluster-and-domain table that relates cluster and domain resources, and the like. In FIG. 2, the data generated by SDDC manager 110 is shown with the respective components for clarity. In embodiments, the components can store their respective data in database 210 (e.g., resource locks 205, resource topology 204, and resource data 202).

Topology manager 145 maintains a resource topology 204 for virtualized infrastructure 152. For topology manager 145, a resource is represented by its identifier. Each resource can have the following relationships with other resource(s): (1) a resource can have zero or more child resources; (2) a resource can have zero or more associated resources; and (3) a resource has one parent resource. For example, a cluster resource can have a plurality of child host resources. A domain resource can have one or more child cluster resources. A domain resource can have associated network manager and virtualization management server resources. A domain resource's parent is the cloud management software instance (the root resource). A cluster resource's parent is a domain resource. Topology manager 145 is agnostic to resource specification and can track resource topology for any types of resources.

Topology manager 145 includes application programming interfaces (APIs) that allow initial generation of resource topology 204 and then updating of resource topology 204 by adding or removing resource nodes. In embodiments, topology manager 145 includes an API for adding a resource node to resource topology 204 ("add resource API"). The add resource API takes as parametric input an identifier for the resource being added, an identifier of the parent resource, and identifier(s) of associated resource(s) if any. Topology manager 145 includes an API for removing a resource node from resource topology 204 ("remove resource API"). The remove resource API takes as parametric input an identifier of a resource to be removed. As part of removal, the resource and its descendants are removed from resource topology 204. The relationships with associated resources are also removed (if any). If there are zero relationships left with an associated resource, then the associated resource is also removed. Parent-child relationship between the parent and the resource node being removed are also deleted. Topology manager 145 includes an API for retrieving the entire resource topology ("retrieve resource topology API"). Topology manager 145 includes an API for retrieving a sub-topology ("retrieve resource sub-topology"). The retrieve resource sub-topology API takes as parametric input a resource identifier. The sub-topology includes the resource, its ancestors, and its descendants.

Resource lock manager 144 is configured to reserve and release resources on behalf of client 216. Client 216 first cooperates with resource lock manager 144 to request a resource reservation. Upon receiving a reservation request, resource lock manager 144 cooperates with topology manager 145 to obtain a sub-topology for the resource. Resource lock manager 144 can then identify all the affected resources from the sub-topology and make the appropriate reservations. Resource lock manager 144 supports reservation and release of resources without depending on resource type.

Resource lock manager 144 reserves resources in a granular manner. In embodiments, resource lock manager 144 reserves resources by asserting resource locks 205 against the resources. Resource lock manager 144 can use two different types of locks, namely, exclusive locks 206 and limited locks 208. These different types of locks are only known internally to resource lock manager 144 and are not exposed to client 216. When client 216 requests a reservation of a resource, resource lock manager 144 will assert an exclusive lock against 206 against that resource. Other resources in the sub-topology can have either exclusive locks 206 or limited locks 208 based on a set of rules. In an embodiment, resource lock manager 144 enforces the following rules with respect to applying resource locks 205: (1) A resource that already has a limited lock can have another limited lock. (2) A resource that already has a limited lock cannot have another exclusive lock by a different client. If a client has reserved a resource X and resource lock manager 144 has asserted a limited lock against resource Y, then that same client (but not another client) can take an exclusive lock on resource Y. (3) A resource that already has an exclusive lock cannot have another limited lock. (4) A resource that already has an exclusive lock cannot have another exclusive lock. (5) A resource that does not have a limited lock can have a limited lock or an exclusive lock.

Resource lock manager 144 identifies which other resources should be reserved when a resource reservation is requested by client 216. These additional resources are identified based on the resource sub-topology obtained from topology manager 145. The sub-topology can include ancestor(s), descendant(s), and associated resource(s). Based on the sub-topology, resource lock manager 144 can identify which are the additional affected resources and perform internal reservations of such additional resources. For example, resource lock manager 144 will assert exclusive locks against the requested resource and its descendants. This means that no other client can reserve these resources. Resource lock manager 144 will assert limited locks against the ancestor resources and associated resources. This means that other limited locks can be asserted against them, but no additional exclusive locks by other clients. Limited-to-exclusive lock promotion is allowed for the same client, but not for a different client. As discussed in more detail below with respect to FIG. 6, resource lock manager 144 may be implemented by a distributed semantic network.

Limited locks 208 allow some workflow operations to occur concurrently, which would not be possible if only exclusive locks were used or if the entire system was locked for each workflow. For example, assume one client requests creation of a cluster, while another client requests expansion, contraction, or deletion of another cluster (even in the same domain). Resource lock manager 144 asserts an exclusive lock on the cluster being added, but a limited lock on the domain of the cluster. Resource lock manager 144 allows the second client to modify/delete the other cluster in the same domain, since the domain only has a limited lock. In another example, assume one client requests creation of a workload domain while another client requests creation/deletion of a cluster in another workload domain. Resource lock manager 144 asserts an exclusive lock against the workload domain being created, but a limited lock on the system root. Resource lock manager 144 allows the second client to create/delete the other workload domain, since the system root only has a limited lock.

Figure 3:
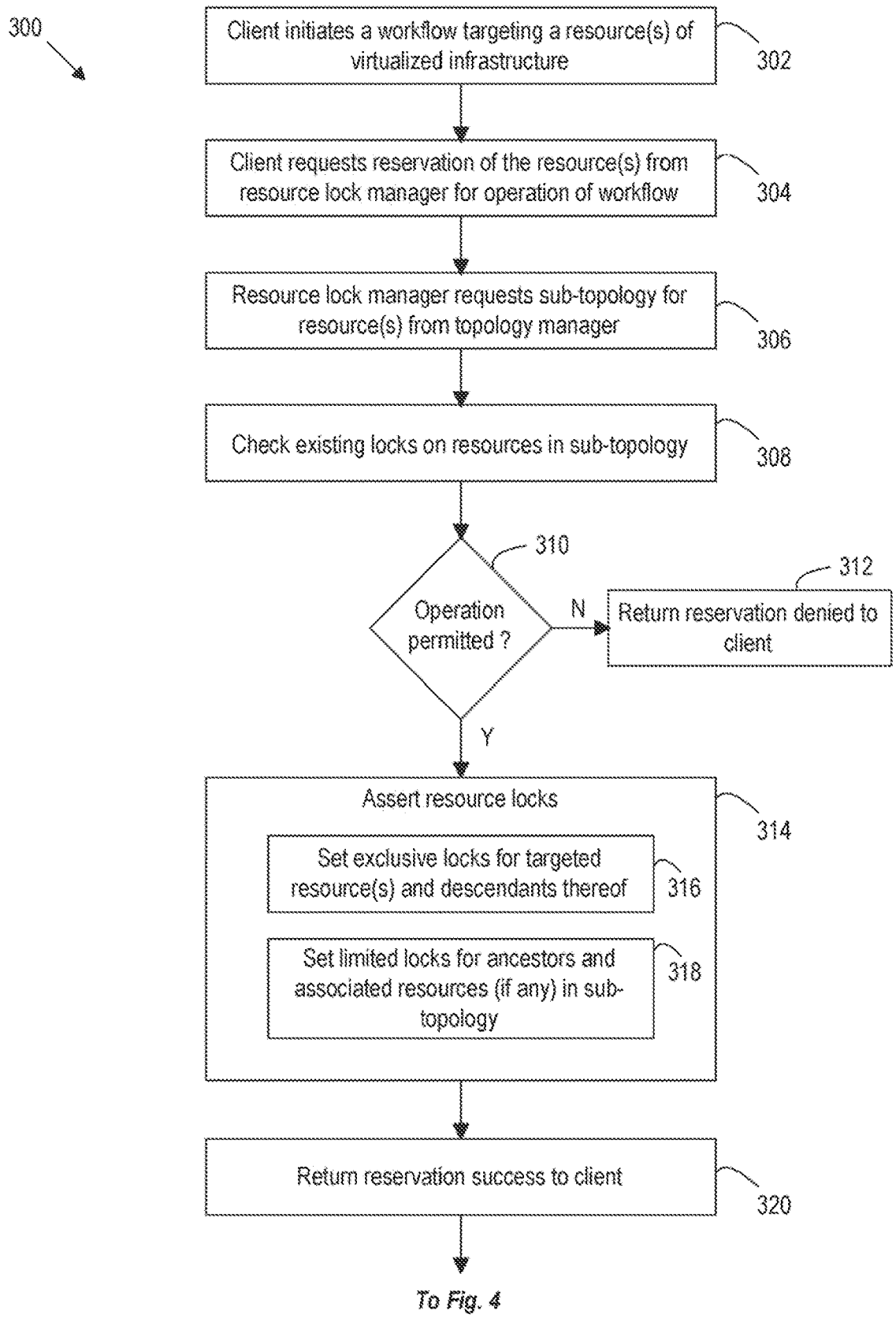
FIGS. 3-4 show a flow diagram depicting a method of executing a workflow by a cloud management system according to an embodiment.
Figure 4:
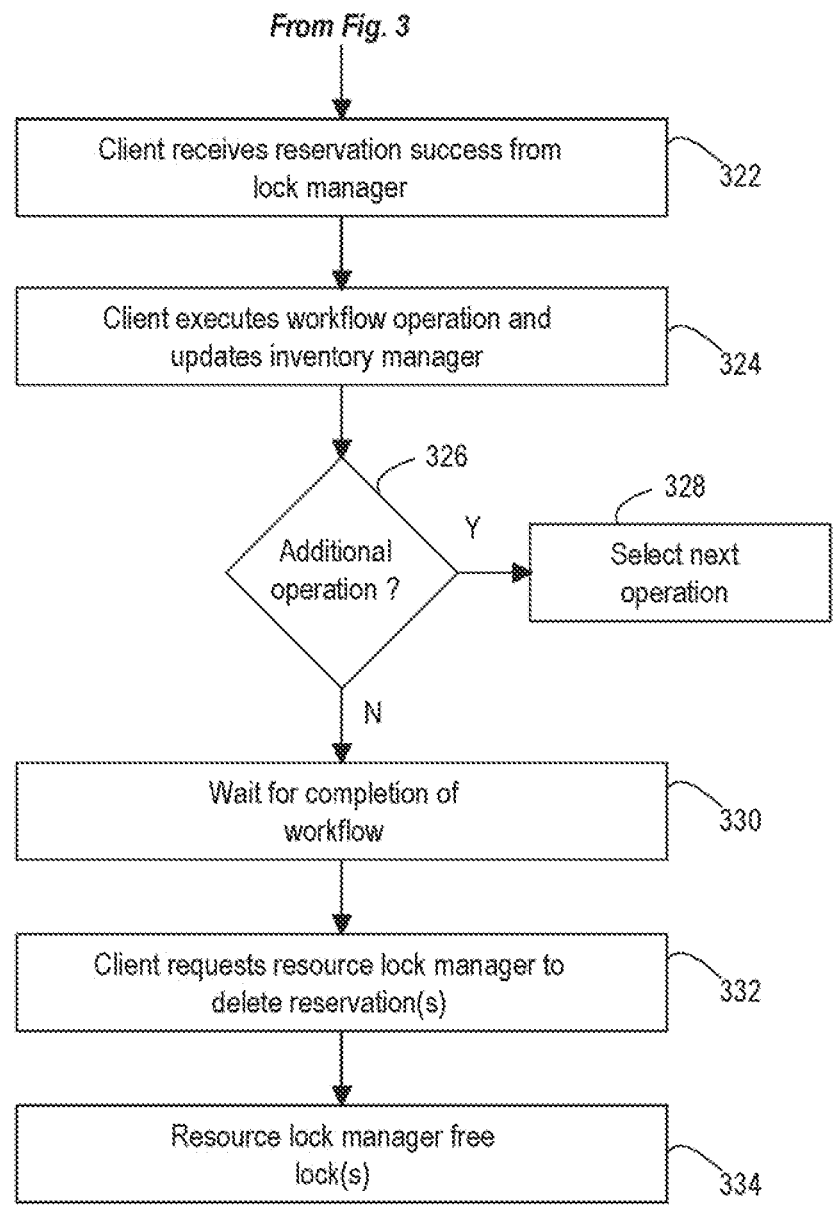

FIGS. 3-4 show a flow diagram depicting a method 300 of executing a workflow by a cloud management system according to an embodiment. Method 300 begins at step 302, where client 216 initiates workflow 212 targeting one or more resources of virtualized infrastructure 152. Workflow 212 includes operation(s) 214 for creating, updating, deleting, or other mutative operation on resource(s). For example, domain manager 149 can initiate an add cluster workflow in response to a request by a user. At step 304, client 216 requests a reservation of the resource(s) from resource lock manager 144 for an operation 214 of workflow 212. For example, for an add cluster workflow, client 216 can request reservations for the constituent hosts of the new cluster.

At step 306, resource lock manager 144 requests a sub-topology for the target resource(s) from topology manager 145. For the add cluster example, resource lock manager 144 retrieves a sub-topology for each host in the new cluster. At step 308, resource lock manager 144 checks for existing locks on resources in the sub-topology. At step 310, resource lock manager 144 determines if the operation is permitted. The operation is not permitted if any target resource or descendants thereof, which are to receive an exclusive lock, already have a preexisting exclusive lock by another client. The operation is still permitted if ancestors and associated resources have preexisting limited locks by other client(s). The operation is not permitted if any ancestor or associated resource has an exclusive lock by another client. If the operation is not permitted, method 300 proceeds from step 310 to step 312, where resource lock manager 144 denies the reservation of the target resource(s) and notifies client 216. At this point, client 216 can suspend or terminate workflow 212 and retry the reservation at another time. If the operation is permitted, method 300 proceeds to step 314.

At step 314, resource lock manager 144 asserts resource locks. This includes, at step 316, setting exclusive locks for the targeted resource(s) and descendants thereof. This further includes, at step 318, setting limited locks for ancestors and associated resources (if any) in the sub-topology. At step 320, resource lock manager 144 returns reservation success to the client. At step 310, resource lock manager 144 notifies client 216 that the requested reservation has been successful. Client 216 is only aware of the reservation against the targeted resource(s). In the add cluster example, resource lock manager 144 sets exclusive locks for the hosts of the new cluster and limited locks on ancestors of the host and associated resources (e.g., the domain having the hosts, the system root, the virtualization management server for the domain, the network manager for the domain).

Referring to FIG. 4, at step 322, client 216 received the notification of successful reservation of the targeted resource(s). At step 324, client 216 executes operation 214 and updates inventory manager 148 (e.g., as to creation or deletion of resource(s)). In the add cluster example, client 216 cooperates with inventory manager 148 to create the cluster resource, create relationships between the cluster and the hosts, and create the relationship between the cluster and the domain. Note that execution of operation 214 can modify resource data 202 (e.g., as in the add cluster workflow), in which case inventory manager 148 notifies topology generator 146 as discussed above. Topology generator 146 then cooperates with topology manager 145 to update resource topology 204. In the add cluster example, resource topology includes the new cluster resource node and its host resource child nodes under the domain node.

At step 326, client 216 determines if there is any additional operation 214 of workflow 212 to be performed. If so, method 300 proceeds to step 328, where client 216 selects the next operation. Method 300 then proceeds back to step 304 and repeats. For example, in the add cluster workflow, domain manager 149 can perform additional cluster-level operation(s) for the new cluster. If at step 326 there are no more operations, method 300 proceeds to step 330, where client 216 waits for completion of workflow 212. At step 332, after workflow 212 is completed, client 216 requests resource lock manager 144 to delete the reservation(s) of targeted resource(s). At step 334, resource lock manager 144 frees the exclusive and limited locks asserted during the operations of the workflow.

Figure 5A:
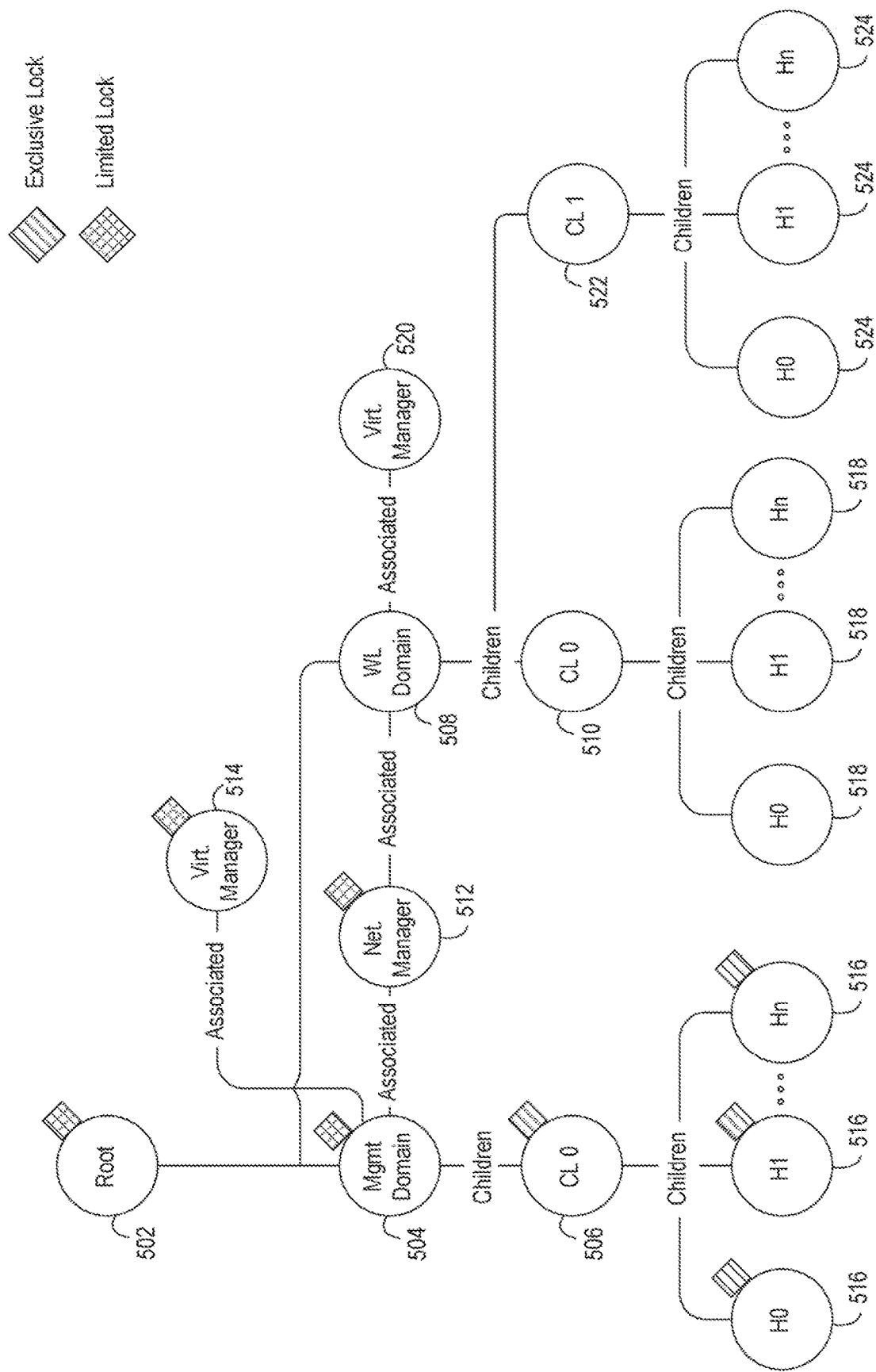
FIG. 5A is a block diagram depicting a resource topology during a workflow operation according to an embodiment.

FIG. 5A is a block diagram depicting a resource topology during a workflow operation according to an embodiment. The resource topology includes a root 502. A management domain 504 and a workload domain 508 are children of root 502. A network manager 512 is associated with each of management domain 504 and workload domain 508. A virtualization manager 514 is associated with management domain 504 (e.g., a virtualization management server). A cluster 506 is a child of management domain 504. Hosts 516 are children of cluster 506. A virtualization manager 520 is associated with workload domain 508. Clusters 510 and 522 are children of workload domain 508. Hosts 518 are children of cluster 510. Hosts 524 are children of cluster 522.

Assume a client requests a reservation on cluster 506 (CL 0) in management domain 504. Assume there are no existing locks on any resources in the resource topology and that cluster 506 can be locked. In such case, resource lock manager 144 sets exclusive locks on cluster 506 and hosts 516, and limited locks on management domain 504, root 502, network manager 512, and virtualization manager 514.

Figure 5B:
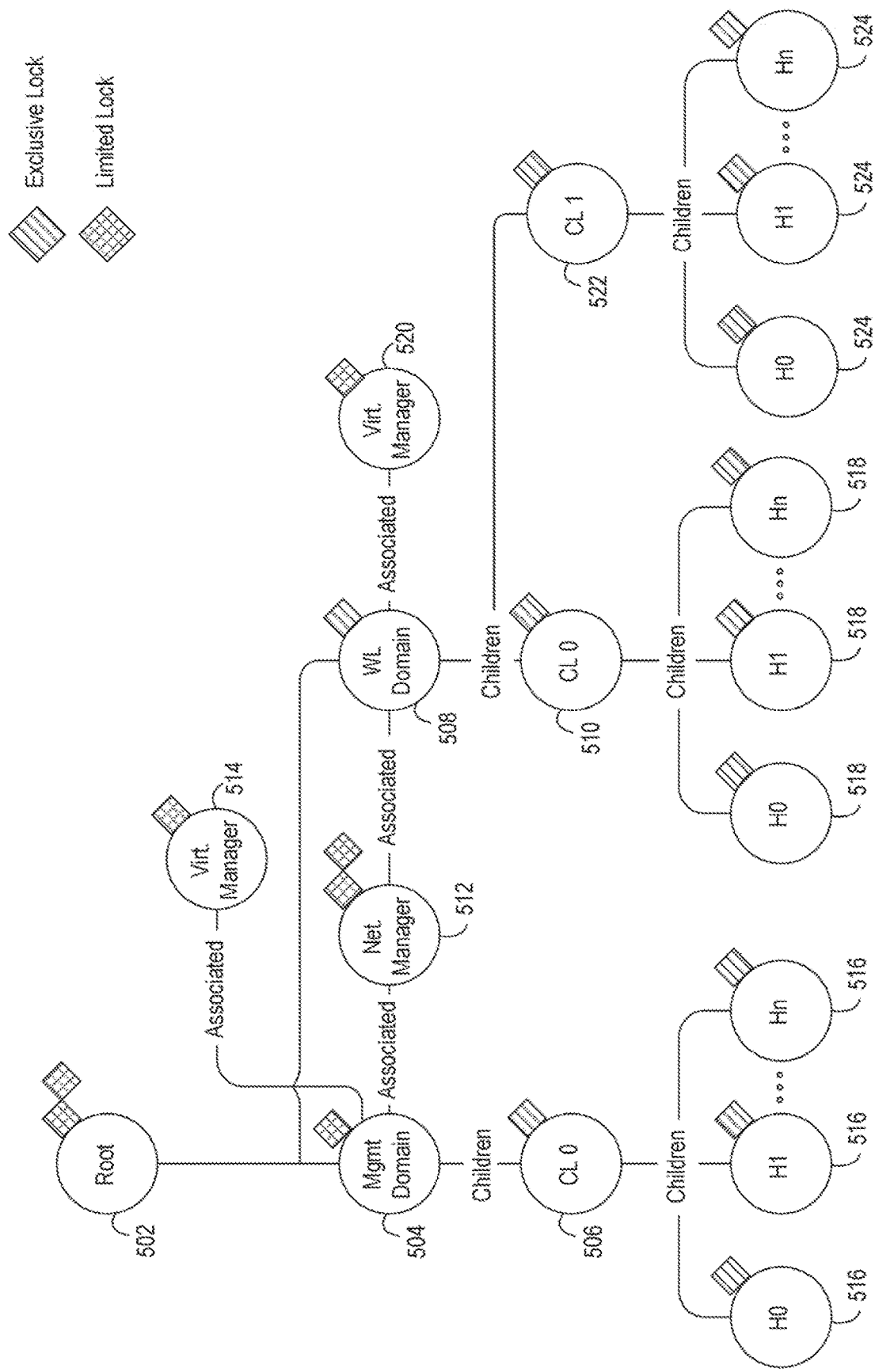
FIG. 5B is a block diagram depicting the resource topology of FIG. 4A during two concurrent workflow operations according to an embodiment.

FIG. 5B is a block diagram depicting the resource topology of FIG. 5A during two concurrent workflow operations according to an embodiment. The first operation of reserving cluster 506 is discussed above and results in the locks shown in FIG. 5A. Assume a client requests a reservation on workload domain 508. The sub-topology of workload domain 508 includes root 502 and associated resources, network manager 512 and virtualization manager 520. Root 502 and network manager 512 have limited locks, not exclusive locks. Further, workload domain 508 has descendants cluster 510, cluster 522, hosts 518, and hosts 524. None of the descendants have locks. Finally, prior to the reservation request, workload domain 508 and virtualization manager 520 are not locked. Thus, resource lock manager 144 determines that the requested reservation of workload domain 508 can be granted. Resource lock manager 144 sets exclusive locks on workload domain 508 and its descendants, namely, clusters 510 and 522, and hosts 518-524. Resource lock manager 144 sets a limited lock on virtualization manager 520 associated with workload domain 508.

In some embodiments, at least a portion of management domain 104 is implemented by a distributed semantic network. For example, the distributed semantic network may implement resource lock manager 144 of SDDC manager 110 which is responsible for disallowing conflicting operations by concurrent requests for operations on resources of virtualized infrastructure 152. For example, the distributed semantic may disallow a resource from being modified or deleted if another operation is currently operation on that resource.

Figure 6:
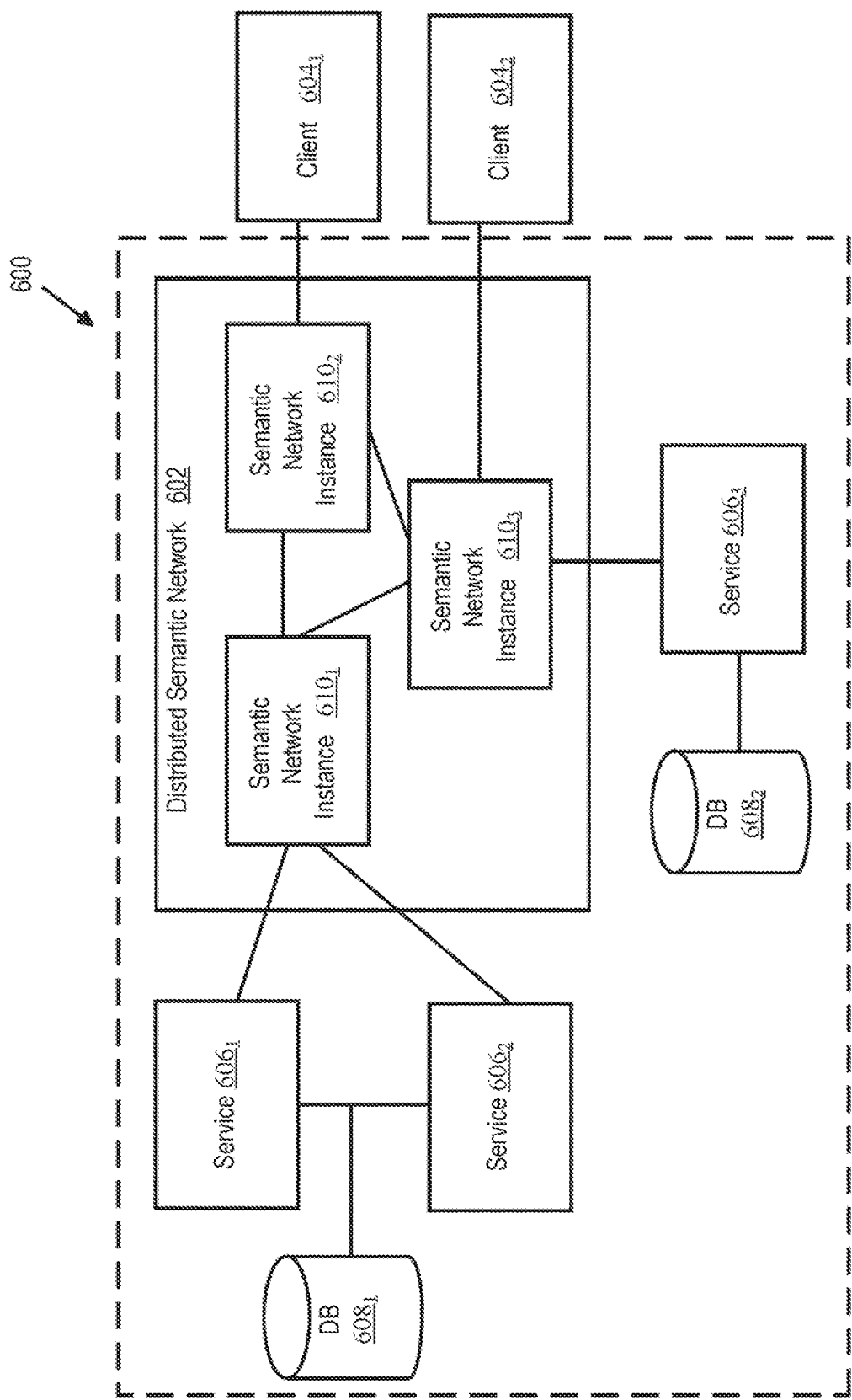
FIG. 6 is a block diagram depicting a distributed semantic network in a cloud computing system according to an embodiment.

FIG. 6 is a block diagram depicting a distributed semantic network 602 in a cloud computing system 600, such as private data center 102, in communication with one or more clients, clients 604$_1$ and 604$_2$ (collectively referred to as clients 604), according to an embodiment. As shown in FIG. 6, cloud computing system 600 may include distributed semantic network 602, one or more services, service 606$_1$, service 606$_2$, and service 606$_3$ (collectively referred to as services 606), and one or more databases, database 608$_1$ and database 608$_2$ (collectively referred to as databases 608). It should be understood that FIG. 6 is a simple example to illustrate a distributed semantic network in a system. In an actual system, a magnitude of different services, clients, and databases may have connections to the distributed semantic network.

Clients 604 each may be a physical or virtual machine that accesses database 608$_1$ or database 608$_2$. Clients 604 may send queries to distributed semantic network 602 to lock an object. A lock may reserve the object so an operation can be performed on the object. Such operations may include creating, updating, or destroying resources of virtualized infrastructure 152.

Distributed semantic network 602 is made up of multiple instances of the semantic network, semantic network instance 610$_1$, semantic network instance 610$_2$, and semantic network instance 610$_3$ (collectively referred to as semantic network instances 610). Distributed semantic network 602 may be a knowledge base that represents semantic relationships between objects in databases 608. As discussed above, the knowledge base of distributed semantic network 602 includes facts and rules, where the facts may represent the objects and the rules specify relationships between the objects.

In some embodiments, distributed semantic network 602 is a hierarchal key-value store or a shared database. In some embodiments, distributed semantic network 602 uses a homoiconic logic programming language, such as prolog. Distributed semantic network 602 semantic network may receive questions from a user about an object and based on the rules, the semantic network may provide a "YES" or "NO" response to the question.

Services 606 may be physical or virtual machines running a service on a database 608. Services 606 may translate data regarding objects from its database 608 to knowledge facts and push those facts to distributed semantic network 602. Services 606 also push new knowledge rules to distributed semantic network 602 for processing those facts. Referring to the resource topology illustrated in FIG. 5A as an example, facts can be translated as "object(Management Domain 504)", "object(C0 506)", "object(H0 516)", "object (Workload Domain 508)", and so on. The connections between objects can be translated to rules. For example, "link(Management Domain 504, C0 506)", link(C0 506, H0 516)", "associate(Management Domain 504, Workload Domain 508)", and so on. While linked and associated are described, these are examples are merely illustrative of knowledge that services 606 may push to distributed semantic network 602, services 606 may push knowledge about other properties of the objects to distributed semantic network 602. As described above, links may be between objects with a parent-child relationship. When an exclusive lock is placed on an object, an exclusive lock may be placed on all objects linked to that object and a limited lock may be placed on all objects associated with that object. It should be noted that the resource topology illustrated in FIG. 5A is merely illustrative of objects and rules that can be obtained as knowledge at distributed semantic network 602. It should be understood that distributed semantic network 602 may manage objects for any type of service.

Figure 7A:
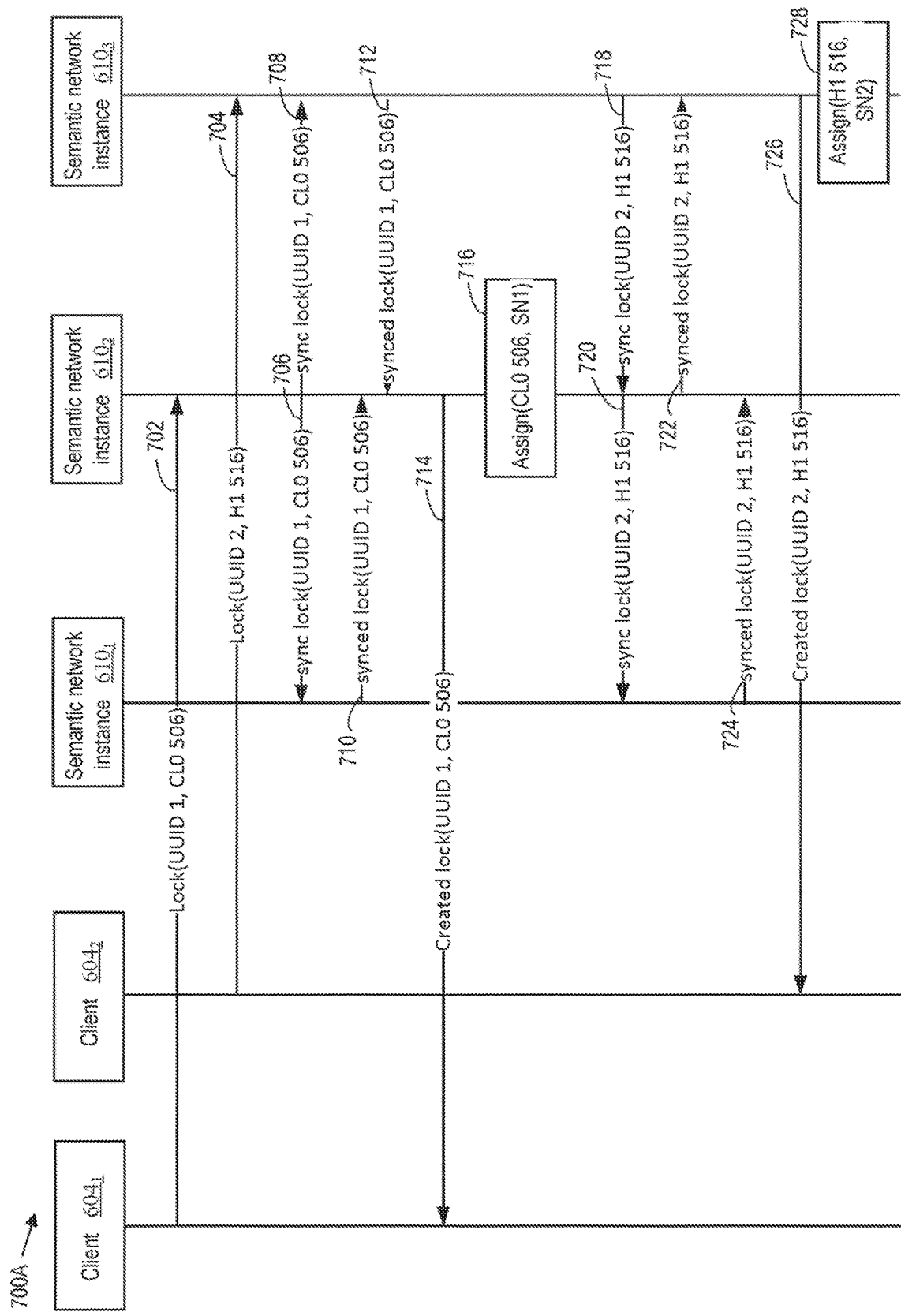
FIG. 7A shows a call flow diagram depicting a method of creating, updating, and synchronizing rules in a distributed semantic network according to an embodiment.
Figure 7B:
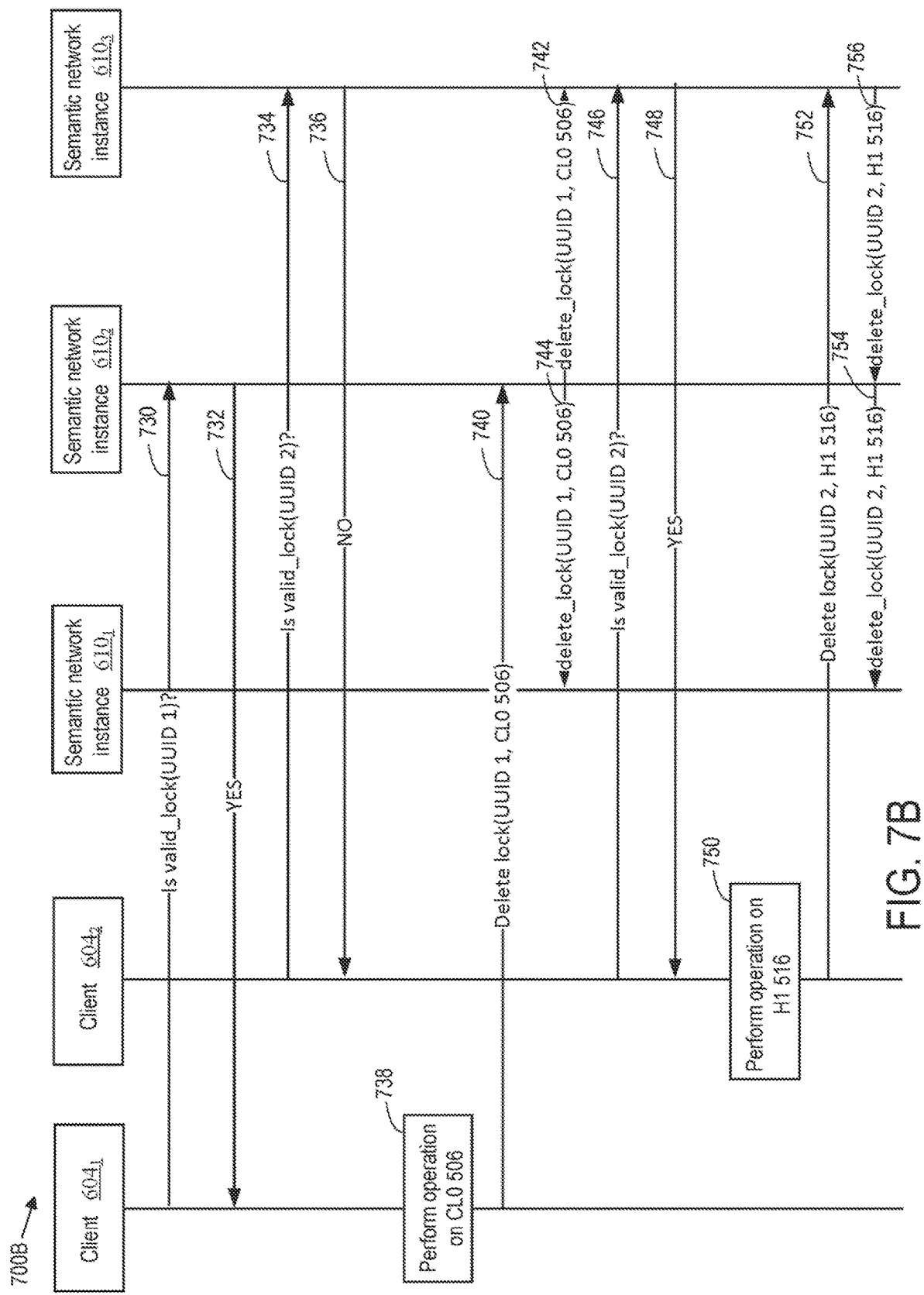
FIG. 7B shows a call flow diagram depicting a method of creating, validating, and deleting locks on resources according to an embodiment.

FIG. 7A shows a call flow diagram depicting a method 700 of creating, updating, and synchronizing rules in a distributed semantic network, such as distributed semantic network 602, according to an embodiment. FIG. 7B shows a call flow diagram depicting a method 700 of creating, validating, and deleting locks in a distributed semantic network, such as distributed semantic network 602, according to an embodiment. FIGS. 7A and 7B may be understood with reference to the resource topology in FIG. 5A.

At operation 702, client $604_1$ may send a request to semantic network instance $610_2$ for a lock on CL0 506. The request may include a UUID of client $604_1$, UUID 1. At operation 704, a concurrent request may be received at semantic network instance $610_3$ from client $604_2$ for a lock on H1 516, with the UUID (UUID 2) of client $604_2$.

When a fact or rule is created or changed, the update is pushed to each of semantic network instances 610 synchronously, so that the semantic network instances 610 are always up to date with the same facts and rules. As shown in operations 700A, semantic network instance $610_2$ synchronizes the new rule, lock(UUID 1, CL0 506), specifying the requested lock to CL0 506 to the other semantic network instances. At operation 706, semantic network instance $610_2$ synchronizes the new rule, lock(UUID 1, CL0 506), to semantic network instance $610_1$. At operation 708, semantic network instance $610_2$ synchronizes the new rule, lock (UUID 1, CL0 506), to semantic network instance $610_3$. In some embodiments, the rule, lock(UUID 1, CL0 506) is pushed to the other semantic network instances 610 as a text command using one or more known mechanisms for sharing a text command.

At operation 710, semantic network instance $610_1$ replies with an acknowledgment that the new rule is synced. At operation 712, semantic network instance $610_3$ replies with an acknowledgment that the new rule is synced. Although operation 710 is shown before operation 712 in the figure, it should be understood that the replies from semantic network instance $610_1$ and semantic network instance $610_3$ could be received in any order or at the same time.

At operation 714, once the new rule, lock(UUID 1, CL0 506), is synchronized at all of the semantic network instances 610, semantic network instance $610_2$ acknowledges to client $604_1$ that the rule specifying the requested lock on the object, CL0 506, has been created. As discussed in more detail below, although the rule specifying the request lock is created, the lock may not be active until the lock is validated.

Distributed semantic network 602 may produce new rules, based on its existing rules, to further expand its knowledge. For example, after the rule specifying the requested lock on an object is created, distributed semantic network 602 may create a new rule to assign a unique and sequential number to the lock. At operation 716, after creating the rule specifying the requested lock on CL0 506, semantic network instance $610_2$ may create a rule, assign (CL0 506, SN1), to assign a unique and sequential number, SN1, to the lock on CL0 506. Although not shown in the figure, this new rule, assign(CL0, SN1), is also pushed to the other semantic network instances 610, so that all of the semantic network instances 610 have the same knowledge. As discussed in more detail below with respect to FIG. 7B, distributed semantic network 602 may use the sequential number in determining the states of objects in the system.

Semantic network instance $610_3$ that received the lock request for H1 516 from client $604_2$, at operation 704, synchronizes another new rule, lock(UUID 2, H1 516), specifying the requested lock on H1 516, to the other semantic network instances. At operation 718, semantic network instance $610_3$ synchronizes the new rule specifying the requested lock on H1 516 to semantic network instance $610_1$. At operation 720, semantic network instance $610_3$ synchronizes the new rule specifying the requested lock on H1 516 to semantic network instance $610_2$.

At operation 722, semantic network instance $610_1$ replies with an acknowledgment that the new rule is synced. At operation 724, semantic network instance $610_2$ replies with an acknowledgment that the new rule is synced. Although operation 722 is shown before operation 724 in the figure, it should be understood that the replies from semantic network instance $610_1$ and semantic network instance $610_2$ could be received in any order or at the same time.

At operation 726, once the new rule, lock(UUID 2, H1 516), is synchronized at all of the semantic network instances 610, semantic network instance $610_3$ acknowledges to client $604_2$ that the rule specifying the requested lock on the object, H1 516, has been created.

At operation 728, after creating the lock on H1 516, semantic network instance $610_3$ may create a rule, assign(H1 516, SN2), to assign a unique and sequential number, SN2, to the lock on H1 516. Although not shown in the figure, this new rule, assign(H1 516, SN2), is also pushed to the other semantic network instances 610, so that all of the semantic network instances 610 have the same knowledge.

As described above with respect to FIG. 5A, when a lock is placed on the object CL0 506, exclusive locks are also placed on all of the linked children of CL0 506, namely, the hosts 516. Limited locks are placed on objects associated with CL0 506, namely, management domain 504, network manager 512, virtualization manager 514, and root 502. Because distributed semantic network 602 has obtained knowledge about the rules specifying the linked and associated objects to CL0 506, distributed semantic network 602 can compute the exclusive locks on hosts 516 and the limited locks on management domain 504, network manager 512, virtualization manager 514, and root 502. As shown as shown in operations 700A, only the new rule for the requested lock needs to be synchronized to the semantic network instances 610. The states of the other linked and associated objects may not need to be updated, because they can be computed on-demand by distributed semantic network 602, using its knowledge rules, in response to a query from a client 604. Accordingly, when an object is locked for performing an operation, the overhead may be small (e.g., a single digit number of operations to create and synchronize the rule and to create the lock) even if thousands of objects are affected by the lock.

Distributed semantic network 602 may share text commands in response to queries from a client 604 or a user. When a client 604 or a user asks a question about an object in a database 608, distributed semantic network 602 processes its facts and rules and replies with a "YES" or "NO" answer to the question. For example, based on a query from a client 604, distributed semantic network 602 determines a specific lock state of an object and responds to the client 604. Referring now to operations 700B in FIG. 7B, at operation 730, after sending the request to lock CL0 506, client 604$_1$ can query semantic network instance 610$_2$ whether the requested lock is permitted. Client 604$_1$ may include its UUID, UUID 1, in the query.

To validate the lock on an object, distributed semantic network 602 checks whether any objects linked or associated with that object already have a lock or constraint on them with an assigned sequential number lower than the sequential number assigned to the lock being validated. If there is not a lock or constraint on the linked and associated objects, distributed semantic network 602 may reply "YES" to the client 604 to indicate the lock is permitted. If there is a lock or constraint on any linked or associated object, distributed semantic network 602 may reply "NO" to the client 604 to indicate the lock is not permitted. When the lock is not permitted, the client 604 may periodically retry the lock. Distributed semantic network 602 will reply with "NO" until the earlier lock on the other object is released.

Upon receiving the query from client 604$_1$ at operation 730, semantic network instance 610$_2$ determines that the lock on CL0 506 is permitted. For example, distributed semantic network 602 determines that there are not any previous locks on CL0 506, hosts 516, management domain 504, network manager 512, virtualization manager 514, and root 502 with a sequence number lower than the sequence number of the requested lock on CL0 506, SN1. Accordingly, semantic network instance 610$_2$ determines the requested lock on CL0 506 is valid and permits the lock. At operation 732, semantic network instance 610$_2$ responds with "YES" to client 604$_1$. The lock on CL0 506 may now be activated.

At operation 734, client 604$_2$ queries semantic network instance 610$_3$ whether the requested lock on H1 516 is permitted. Client 604$_2$ may include its UUID, UUID 2, in the query. Semantic network instance 610$_3$ may determine based on its knowledge that of the lock on CL0 506 with the sequential number, SN 1, which is lower than the sequential number, SN 2, assigned to the lock for H1 516 that the requested lock on H1 516 is not permitted. Based on its knowledge of the objects linked and associated with CL0 506, semantic network instance 610$_3$ may determine the exclusive locks on hosts 516 and the limited locks on management domain 504, network manager 512, virtualization manager 514, and root 502, and semantic network instance 610$_3$ disallows the conflicting requested lock on H1 516. At operation 736, semantic network instance 610$_3$ responds with "NO" to client 604$_2$ and the lock on H1 516 is not activated.

At operation 738, after CL0 506 is locked, client 604$_1$ may perform an operation on CL0 506. For example, client 604$_1$ may change a configuration of CL0 506, such as adding or removing a host from the cluster. At operation 740, client 604$_1$ indicates to semantic network instance 610$_2$ to release the lock on the object. Distributed semantic network 602 will delete the lock on CL0 506 as well as any locks or constraints on the other objects linked or associated with CL0 506. Semantic network instance 610$_2$ synchronizes the deletion of the rule specifying the lock on CL0 506 with semantic network instance 610$_3$ at operation 742 and semantic network instance 610$_1$ at operation 744 so that all of the semantic network instances 610 will have the same knowledge.

In some embodiments, locks are associated with an expiration time upon expiry of which the lock is released. In some embodiments, distributed semantic network 602 may create a new rule for a lock, specifying expiry of the lock. In some embodiments, when a lock is created on an object, a timer may be started or a timestamp may be associated with the lock. Once the timer expires, or a threshold duration from the time indicated by the timestamp has been met, the lock on the object may be removed. Use of an expiration for locks may prevent an object from being locked indefinitely if the client 604 that requested the lock fails before the lock is deleted.

As discussed above, when a lock is not permitted, the client 604 may periodically retry the lock. Accordingly, at operation 746, client 604$_2$ may retry the lock on H1 516 (that was not permitted at operation 736). In some embodiments, client 604$_2$ retries the lock on H1 516 after a configured retry duration. Because the lock on CL0 506 has been deleted along with the locks on the other objects linked or associated with CL0 506, semantic network instance 610$_3$ now permits the lock. At operation 748, semantic network instance 610$_3$ responds to client 604$_2$ with "YES" and the lock on H1 516 is activated.

At operation 750, after H1 516 is locked, client 604$_2$ may perform an operation on H1 516. For example, client 604$_2$ may change a configuration of the host. At operation 752, client 604$_2$ indicates to semantic network instance 610$_3$ to release the lock on the object. Distributed semantic network 602 will delete the lock on H1 516 as well as any locks or constraints on the other objects linked or associated with H1 516. Semantic network instance 610$_3$ synchronizes the deletion of the rule specifying the lock on H1 516 with semantic network instance 610$_1$ at operation 754, and synchronizes the deletion of the rule specifying the lock on H1 516 with semantic network instance 610$_3$ at operation 756, so that all of the semantic network instances 610 will have the same knowledge.

Figure 8:
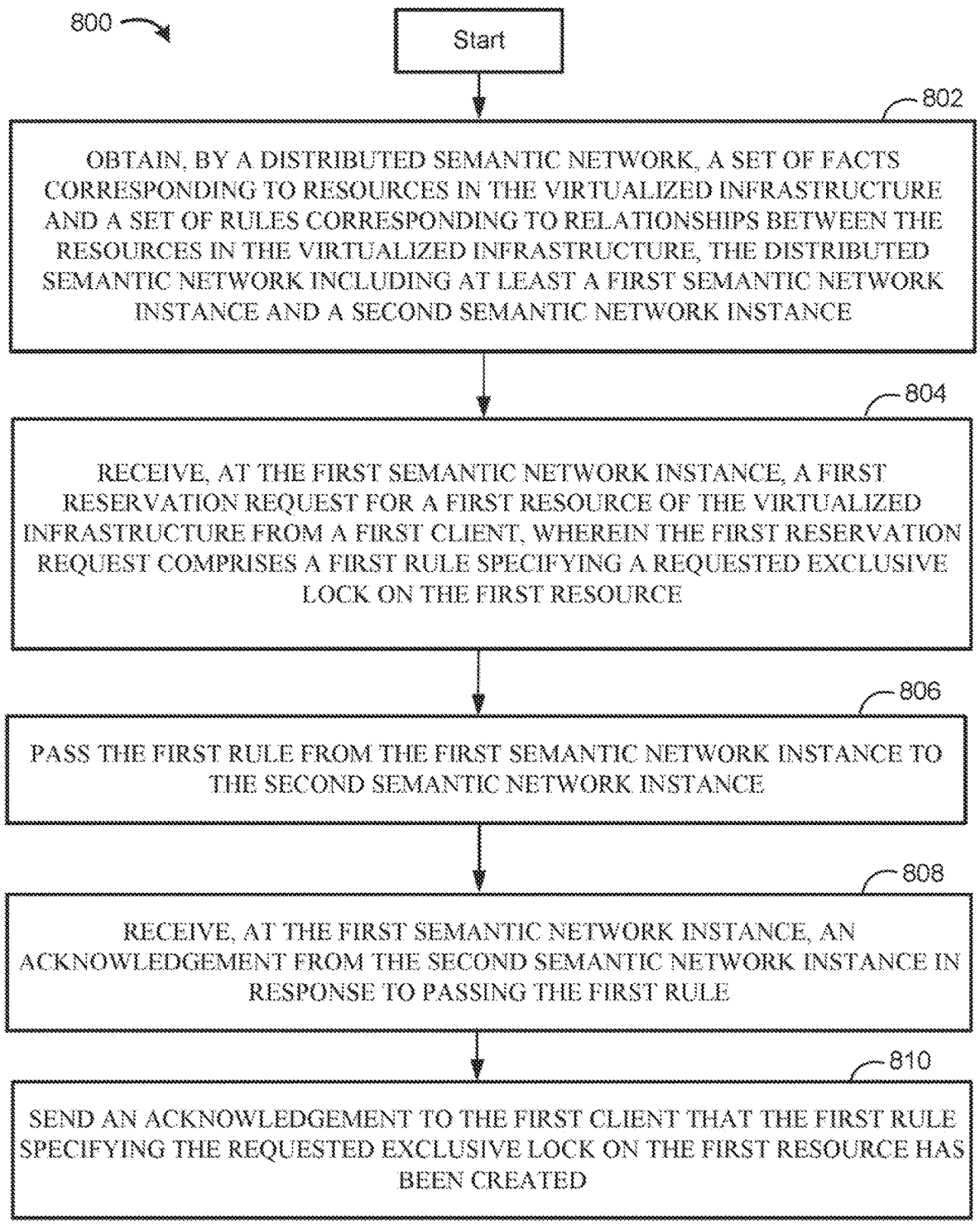
FIG. 8 shows a flow diagram depicting a method of reserving a resource of virtualized infrastructure in a data center on behalf of a client according to an embodiment.

FIG. 8 shows a flow diagram depicting operations 800 for reserving a resource of virtualized infrastructure (e.g., from the resource topology illustrated in FIG. 5A) in a data center (e.g., private data center 102) on behalf of a client (e.g., a client 604) according to an embodiment.

At operation 802, a distributed semantic network (e.g., distributed semantic network 602) obtains a set of facts corresponding to resources in the virtualized infrastructure (e.g., the objects 502-524 in FIG. 5A) and a set of rules corresponding to relationships (e.g., child, linked, associated, etc.) between the resources in the virtualized infrastructure. The distributed semantic network includes at least a first semantic network instance (e.g., semantic network instance $610_2$) and a second semantic network instance (e.g., semantic network instance $610_3$).

At operation 804, the first semantic network instance receives a first reservation request for a first resource (e.g., CL0 506) of the virtualized infrastructure from a first client (e.g., client $604_1$). The first reservation request comprises a first rule specifying a requested exclusive lock on the first resource (e.g., "lock(UUID 1, CL0 506)"). The first reservation request may include an identifier (e.g., UUID1) of the first client.

At operation 806, the first semantic network instances passes the first rule (e.g., "sync lock(UUID 1, CL0 506)") to the second semantic network instance.

At operation 808, the first semantic network instance receives an acknowledgement (e.g., "synced lock(UUID 1, CL0 506)") from the second semantic network instance in response to passing the first rule.

At operation 810, the first semantic network instance sends an acknowledgement (e.g., "created lock(UUID 1, CL0 506)") to the first client that the first rule specifying the requested exclusive lock on the first resource has been created.

Operations 800 may further includes generating a second rule (e.g., "assign(CL0 506, SN1)"), at the first semantic network instance, to assign a first sequential value (e.g., SN1) to first reservation request. The first semantic network instance may pass the second rule to the second semantic network instance.

Operations 800 may further include receiving, at the second semantic network instance, a second reservation request for a second resource (e.g., H1 516) of the virtualized infrastructure from a second client (e.g., client $604_2$). The second reservation request comprises a second rule (e.g., "lock(UUID 2, H1 516)") specifying a requested exclusive lock on the second resource. The second semantic network instance may pass the second rule (e.g., "sync lock(UUID 2, H1 516)") to the first semantic network instance. The second semantic network instance may receive an acknowledgement (e.g., "synced lock(UUID 2, H1 516)") from the first semantic network instance in response to passing the second rule. The second semantic network instance may send an acknowledgement (e.g., "created lock (UUID 2, H1 516)") to the second client that the second rule specifying the requested exclusive lock on the second resource has been created.

Operations 800 may further include generating a third rule (e.g., "assign(H1 516, SN2)"), at the second semantic network instance, to assign a second sequential value (e.g., SN2) to the second reservation request. The second semantic network instance may passing the third rule to the first semantic network instance.

Operations 800 may further include receiving, at the second semantic network instance, a query (e.g., "is valid_lock(UUID 2)") from the second client querying whether the second reservation request is permitted. The second semantic network instance may response to the second client that the second reservation request is not permitted (e.g., "NO") based on one or more of: the obtained set of facts and set of rules indicating that there is pre-existing reservation on the second resource or on a resource having relationship with the second resource or the first sequential number assigned to the first reservation request being smaller than the second sequential value assigned to second reservation request.

Operations 800 may further include receiving, at the first semantic network instance, a query (e.g., "is valid_lock (UUID 1)") from the first client querying whether the first reservation request is permitted. The first semantic network instance may respond the first client that the first reservation request is permitted (e.g., "YES") based on one or more of: the obtained set of facts and set of rules indicating that there is no pre-existing reservation on the first resource or on a resource having relationship with the first resource or the first sequential number assigned to the first reservation request being smaller than the second sequential value assigned to second reservation request.

Operations 800 may further include setting the exclusive lock on the first resource. The first client may perform an operation (e.g., change a configuration, delete, add or remove a host to/from cluster 0 506, etc.) on the first resource. The first semantic network instance may delete the exclusive lock on the first resource. The first semantic network instance may generate a second rule (e.g., "delete lock(UUID 1, CL0 506)") specifying the deletion of the exclusive lock on the first resource. The first semantic network instance may pass the second rule to the second semantic network instance.

Operations 800 may further include setting the exclusive lock on the first resource. The first semantic network instance may generate a second rule specifying an expiration duration associated with the exclusive lock on the first resource. The first semantic network instance may pass the second rule to the second semantic network instance. The first semantic network instance and the second semantic network instance may delete the exclusive lock on the first resource at expiry of the expiration duration.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of reserving a resource of a virtualized infrastructure in a data center on behalf of a client, the method comprising:
   obtaining, by a distributed semantic network, a set of facts corresponding to resources in the virtualized infrastructure and a set of rules corresponding to relationships between the resources in the virtualized infrastructure, the distributed semantic network including at least a first semantic network instance and a second semantic network instance;
   receiving, at the first semantic network instance, a first reservation request for a first resource of the virtualized infrastructure from a first client, wherein the first reservation request comprises a first rule specifying a requested exclusive lock on the first resource;
   passing the first rule from the first semantic network instance to the second semantic network instance;
   receiving, at the first semantic network instance, an acknowledgement from the second semantic network instance in response to passing the first rule; and
   sending an acknowledgement to the first client that the first rule specifying the requested exclusive lock on the first resource has been created.

2. The method of claim 1, wherein the first reservation request includes an identifier of the first client.

3. The method of claim 1, further comprising:
   generating a second rule, at the first semantic network instance, to assign a first sequential value to the first reservation request; and
   passing the second rule from the first semantic network instance to the second semantic network instance.

4. The method of claim 1, further comprising:
   receiving, at the second semantic network instance, a second reservation request for a second resource of the virtualized infrastructure from a second client, wherein the second reservation request comprises a second rule specifying a requested exclusive lock on the second resource;
   passing the second rule from the second semantic network instance to the first semantic network instance;
   receiving, at the second semantic network instance, an acknowledgement from the first semantic network instance in response to passing the second rule; and
   sending an acknowledgement to the second client that the second rule specifying the requested exclusive lock on the second resource has been created.

5. The method of claim 4, further comprising:
   generating a third rule, at the second semantic network instance, to assign a second sequential value to the second reservation request; and
   passing the third rule from the second semantic network instance to the first semantic network instance.

6. The method of claim 4, further comprising:
   receiving, at the second semantic network instance, a query from the second client querying whether the second reservation request is permitted; and
   responding, by the second semantic network instance to the second client, that the second reservation request is not permitted based on one or more of: the obtained set of facts and set of rules indicating that there is a pre-existing reservation on the second resource or on a resource having a relationship with the second resource; a first sequential number assigned to the first reservation request being smaller than a second sequential value assigned to the second reservation request; or a combination thereof.

7. The method of claim 4, further comprising:
   receiving, at the first semantic network instance, a query from the first client querying whether the first reservation request is permitted; and
   responding, by the first semantic network instance to the first client, that the first reservation request is permitted based on one or more of: the obtained set of facts and set of rules indicating that there is no pre-existing reservation on the first resource or on a resource having a relationship with the first resource; a first sequential number assigned to the first reservation request being larger than a second sequential value assigned to the second reservation request, or a combination thereof.

8. The method of claim 1, further comprising:
   setting the exclusive lock on the first resource;
   performing, by the first client, an operation on the first resource;
   deleting, by the first semantic network instance, the exclusive lock on the first resource;
   generating, by the first semantic network instance, a second rule specifying the deletion of the exclusive lock on the first resource; and
   passing the second rule from the first semantic network instance to the second semantic network instance.

9. The method of claim 1, further comprising:
   setting the exclusive lock on the first resource;
   generating, by the first semantic network instance, a second rule specifying an expiration duration associated with the exclusive lock on the first resource;
   passing the second rule from the first semantic network instance to the second semantic network instance; and deleting, by the first semantic network instance and the second semantic network instance, the exclusive lock on the first resource at expiry of the expiration duration.

10. A system comprising:
one or more processors; and
at least one memory, the one or more processors and the at least one memory configured to:
  obtain, by a distributed semantic network, a set of facts corresponding to resources in a virtualized infrastructure and a set of rules corresponding to relationships between the resources in the virtualized infrastructure, the distributed semantic network including at least a first semantic network instance and a second semantic network instance;
  receive, at the first semantic network instance, a first reservation request for a first resource of the virtualized infrastructure from a first client, wherein the first reservation request comprises a first rule specifying a requested exclusive lock on the first resource;
  pass the first rule from the first semantic network instance to the second semantic network instance;
  receive, at the first semantic network instance, an acknowledgement from the second semantic network instance in response to passing the first rule; and
  send an acknowledgement to the first client that the first rule specifying the requested exclusive lock on the first resource has been created.

11. The system of claim 10, wherein the first reservation request includes an identifier of the first client.

12. The system of claim 10, the one or more processors and the at least one memory further configured to:
  generate a second rule, at the first semantic network instance, to assign a first sequential value to the first reservation request; and
  pass the second rule from the first semantic network instance to the second semantic network instance.

13. The system of claim 10, the one or more processors and the at least one memory further configured to:
  receive, at the second semantic network instance, a second reservation request for a second resource of the virtualized infrastructure from a second client, wherein the second reservation request comprises a second rule specifying a requested exclusive lock on the second resource;
  pass the second rule from the second semantic network instance to the first semantic network instance;
  receive, at the second semantic network instance, an acknowledgement from the first semantic network instance in response to passing the second rule; and
  send an acknowledgement to the second client that the second rule specifying the requested exclusive lock on the second resource has been created.

14. The system of claim 13, the one or more processors and the at least one memory further configured to:
  generate a third rule, at the second semantic network instance, to assign a second sequential value to the second reservation request; and
  pass the third rule from the second semantic network instance to the first semantic network instance.

15. The system of claim 13, the one or more processors and the at least one memory further configured to:
  receive, at the second semantic network instance, a query from the second client querying whether the second reservation request is permitted; and
  respond, by the second semantic network instance to the second client, that the second reservation request is not permitted based on one or more of: the obtained set of facts and set of rules indicating that there is a pre-existing reservation on the second resource or on a resource having a relationship with the second resource; a first sequential number assigned to the first reservation request being smaller than a second sequential value assigned to the second reservation request; or a combunation thereof.

16. The system of claim 13, the one or more processors and the at least one memory further configured to:
  receive, at the first semantic network instance, a query from the first client querying whether the first reservation request is permitted; and
  respond, by the first semantic network instance to the first client, that the first reservation request is permitted based on one or more of: the obtained set of facts and set of rules indicating that there is no pre-existing reservation on the first resource or on a resource having relationship with the first resource; a first sequential number assigned to the first reservation request being larger than a second sequential value assigned to the second reservation request; or a combination thereof.

17. The system of claim 10, the one or more processors and the at least one memory further configured to:
  set the exclusive lock on the first resource;
  perform, by the first client, an operation on the first resource;
  delete, by the first semantic network instance, the exclusive lock on the first resource;
  generate, by the first semantic network instance, a second rule specifying the deletion of the exclusive lock on the first resource; and
  pass the second rule from the first semantic network instance to the second semantic network instance.

18. The system of claim 10, the one or more processors and the at least one memory further configured to:
  set the exclusive lock on the first resource;
  generate, by the first semantic network instance, a second rule specifying an expiration duration associated with the exclusive lock on the first resource;
  pass the second rule from the first semantic network instance to the second semantic network instance; and
  delete, by the first semantic network instance and the second semantic network instance, the exclusive lock on the first resource at expiry of the expiration duration.

19. A non-transitory computer-readable medium comprising instructions that, when executed by one or more processors of a computing system, cause the computing system to perform operations for reserving a resource of a virtualized infrastructure in a data center on behalf of a client, the operations comprising:
  obtaining, by a distributed semantic network, a set of facts corresponding to resources in the virtualized infrastructure and a set of rules corresponding to relationships between the resources in the virtualized infrastructure, the distributed semantic network including at least a first semantic network instance and a second semantic network instance;
  receiving, at the first semantic network instance, a first reservation request for a first resource of the virtualized infrastructure from a first client, wherein the first reservation request comprises a first rule specifying a requested exclusive lock on the first resource;
  passing the first rule from the first semantic network instance to the second semantic network instance;

receiving, at the first semantic network instance, an acknowledgement from the second semantic network instance in response to passing the first rule; and sending an acknowledgement to the first client that the first rule specifying the requested exclusive lock on the first resource has been created.

20. The non-transitory computer-readable medium of claim 19, wherein the first reservation request includes an identifier of the first client.

\* \* \* \* \*